United States Patent
Lester et al.

(10) Patent No.: US 12,112,144 B2
(45) Date of Patent: *Oct. 8, 2024

(54) API SPECIFICATION GENERATION

(71) Applicant: Google LLC, Mountain View, CA (US)

(72) Inventors: Alex David Lester, Mountain View, CA (US); Sibo Liu, Sunnyvale, CA (US); Che Liu, La Jolla, CA (US); Jared Scott Borner, Redwood City, CA (US); Andrew Marsh Gardiner, Mountain View, CA (US); Matthew Symonds, Mountain View, CA (US); Kenneth Chan, Mountain View, CA (US); Michael Christopher Yara, Longmont, CA (US); Terrence Li, Chicago, IL (US); Joy Aloysius Thomas, Cupertino, CA (US); Sri Harsha Vardhan Reddy Chevuru, San Jose, CA (US); Tsenguun Tsogbadrakh, San Jose, CA (US)

(73) Assignee: Google LLC, Mountain View, CA (US)

( * ) Notice: Subject to any disclaimer, the term of this patent is extended or adjusted under 35 U.S.C. 154(b) by 33 days.

This patent is subject to a terminal disclaimer.

(21) Appl. No.: 17/502,297

(22) Filed: Oct. 15, 2021

(65) Prior Publication Data

US 2022/0035600 A1 Feb. 3, 2022

Related U.S. Application Data

(63) Continuation of application No. 16/936,836, filed on Jul. 23, 2020, now Pat. No. 11,150,874, which is a (Continued)

(51) Int. Cl.
*G06F 8/10* (2018.01)
*G06F 8/74* (2018.01)
(Continued)

(52) U.S. Cl.
CPC ............ *G06F 8/10* (2013.01); *G06F 8/74* (2013.01); *G06F 9/54* (2013.01); *G06F 16/9027* (2019.01); *G06F 16/903* (2019.01)

(58) Field of Classification Search
None
See application file for complete search history.

(56) References Cited

U.S. PATENT DOCUMENTS

| 8,627,317 B2 * | 1/2014 | Altman | G06F 11/3476 718/100 |
| 9,077,610 B2 * | 7/2015 | Bansal | H04L 67/535 |

(Continued)

FOREIGN PATENT DOCUMENTS

JP    2020024567 A   *   2/2020

OTHER PUBLICATIONS

Brandon [online], "Using Swagger to Detect Breaking API Changes," Oct. 2015, [retrieved May 17, 2019], retrieved from:https://swagger.io/blog/api-development/using-swagger-to-detect-breaking-- api-changes/>, 4 pages.

(Continued)

*Primary Examiner* — Philip Wang
(74) *Attorney, Agent, or Firm* — Lerner David LLP

(57) ABSTRACT

Methods and systems that facilitate automatic generation of Application Programming Interface (API) specification from web traffic. Methods include obtaining a plurality of API requests and responses to the plurality of API requests. Methods include processing these API requests and responses to API requests to identify one or more attributes, such as, for example, variables, query parameters, response status codes, and response schemas. Methods include identifying variables using a tree data structure to represent resource paths. Methods include identifying query parameters based on resource items in resource paths. Methods (Continued)

include determining that the API call does not conform to the API specification by comparing one or more attributes of the API call with the attributes of the API specification.

18 Claims, 3 Drawing Sheets

Related U.S. Application Data continuation of application No. 16/415,859, filed on May 17, 2019, now Pat. No. 10,747,505.

(51) Int. Cl.
    *G06F 9/54*         (2006.01)
    *G06F 16/901*     (2019.01)
    *G06F 16/903*     (2019.01)

(56) References Cited

U.S. PATENT DOCUMENTS

| | | | | |
|---|---|---|---|---|
| 10,194,001 | B1* | 1/2019 | Gardiner | H04L 67/10 |
| 10,437,712 | B1* | 10/2019 | Tyler | G06F 11/3684 |
| 10,740,215 | B2* | 8/2020 | Lowe | G06F 9/44526 |
| 10,749,990 | B1* | 8/2020 | Gardiner | H04L 67/56 |
| 2004/0015487 | A1* | 1/2004 | Lin | G06F 16/289 |
| 2012/0054472 | A1* | 3/2012 | Altman | G06F 11/3419 |
| | | | | 712/E9.032 |
| 2014/0351316 | A1* | 11/2014 | Boubez | H04L 63/08 |
| | | | | 709/218 |
| 2015/0095923 | A1* | 4/2015 | Sarid | G06F 8/30 |
| | | | | 719/328 |
| 2015/0143344 | A1* | 5/2015 | Davis | G06F 11/366 |
| | | | | 717/129 |
| 2016/0239274 | A1* | 8/2016 | Strachota | G06F 8/30 |
| 2018/0196643 | A1* | 7/2018 | Dolby | H04L 67/025 |
| 2019/0066694 | A1* | 2/2019 | Hirzel | G06F 8/30 |
| 2019/0095318 | A1* | 3/2019 | Bahrami | G06F 11/3676 |
| 2019/0196796 | A1* | 6/2019 | Bahrami | G06F 8/38 |
| 2019/0196811 | A1* | 6/2019 | Bahrami | G06F 8/10 |
| 2019/0213326 | A1* | 7/2019 | Dykes | G06F 21/552 |
| 2019/0354414 | A1* | 11/2019 | Bailey | G06F 9/54 |
| 2020/0133744 | A1* | 4/2020 | MacLeod | G06F 9/541 |
| 2020/0364044 | A1* | 11/2020 | Bahrami | G06F 8/73 |
| 2021/0006496 | A1* | 1/2021 | Xiong | H04Q 9/00 |
| 2021/0141904 | A1* | 5/2021 | Gauthier | G06F 21/577 |

OTHER PUBLICATIONS

Brigandi [online], "Detecting Personal Data within API Communication Using Deep Learning," Apr. 2019, [retrieved on May 17, 2019], retrieved from: URL<https://towardsdatascience.com/detecting-personal-data-within-api-communication-using-deep-learning-9e52a1ff09c6>, 9 pages.

Here Developer [online], "Traffic API: Introduction," 2019 [retrieved on May 17, 2019], retrieved from: URL<https://developer.here.com/documentation/traffic/topics/what-is.ht- ml>, 3 pages.

Sturgeon [online], "Creating API Specifications from Bulls*t," Mar. 2018, [retrieved on May 17, 2019], retrieved from: URL<https://blog.apisyouwonthate.com/creating-api-specifications-from-- bulls-t-f5a54c005135>, 5 pages.

* cited by examiner

API SPECIFICATION GENERATION

CROSS REFERENCE TO RELATED APPLICATIONS

The present application is a continuation of U.S. application Ser. No. 16/936,836, filed Jul. 23, 2020, which is a continuation of U.S. application Ser. No. 16/415,859 (now U.S. Pat. No. 10,747,505), filed May 17, 2019, all of which are incorporated herein by reference.

BACKGROUND

A server may provide various services that can be consumed via application programming interface (API) requests from applications running on client devices. However, the full set of services provided by the server may either not be documented or may only be partially documented in an API specification. Moreover, the services may change over time, with new services being added. Discovery of these services and how to instantiate them may be difficult in the absence of an accurate API specification.

SUMMARY

In general, one innovative aspect of the subject matter described in this specification can be embodied in methods including the operations of obtaining, by a data processing apparatus, a plurality of API requests and responses to the plurality of API requests; processing, by the data processing apparatus, the plurality of API requests and responses to the plurality of API requests, to identify one or more attributes of an API specification, the processing including: identifying variables of the API specification from the plurality of API requests using a tree data structure, the identifying variables including: generating the tree data structure using resource items in resource paths of the plurality of prior API requests, wherein each resource item is represented by a node in the tree data structure and wherein the tree data structure includes a plurality of nodes, including a root node and one or more child nodes; beginning with the root node of the tree data structure, for each given node that includes one or more child nodes: determining a number of child nodes that directly descend from the given node; modifying the tree data structure by collapsing the child nodes that directly descend from the given node into a single variable node based on the number of child nodes that directly descend from the given node satisfying a first threshold; for each child node that directly descends from the child nodes that were collapsed into the single variable node, modifying the tree data structure by making the child nodes that directly descend from the child nodes that were collapsed into the single variable node, descend from the single variable node; identifying query parameters of the API specification based on resource items in resource paths of the plurality of API requests; and generating, by the data processing apparatus, the API specification using the identified one or more attributes. Other embodiments of this aspect include corresponding systems, devices, apparatus, and computer programs configured to perform the actions of the methods. The computer programs (e.g., instructions) can be encoded on computer storage devices. These and other embodiments can each optionally include one or more of the following features.

Methods can include identifying, from each of the plurality of API requests, data within a body of the API request; identifying, from each of the plurality of API requests, an operation type of the API request; and identifying, from the responses to the plurality of API requests, response status codes and a response schema for each of the response status codes.

Generating, by the data processing apparatus, the API specification using the identified one or more attributes, can include generating the API specification using the identified one or more attributes for only those API requests for which the response status code indicated that the API request is valid.

Generating the API specification using the identified one or more attributes for only those API requests for which the response status code indicated that the API request is valid can include generating the API specification using the identified one or more attributes for only those API requests for which the response status code comprises a HTTP 2xx status code.

Identifying query parameters of the API specification based on resource items in resource paths of the plurality of web requests can include, for each resource path of the plurality of API requests: identifying a query parameter portion of the resource path by searching for a first specified delimiter in the resource path; identifying within the query parameter portion, one or more strings that are separated by a second specified delimiter; for each of the one or more strings: identifying a query parameter from a portion of the string that precedes a third specified delimiter; and identifying a value of the query parameter from a portion of the string that follows the third specified delimiter.

Methods can include receiving, by the data processing apparatus and from a client device, an API call; and determining, by the data processing apparatus, that the API call does not conform to the API specification by comparing one or more attributes of the API call with the attributes of the API specification.

Methods include obtaining, by the data processing apparatus, the plurality of API requests and responses to the plurality of API requests from API traffic logs.

Particular embodiments of the subject matter described in this specification can be implemented to automatically generate (i.e., without user intervention) an API specification by analyzing API traffic between client devices and backend systems. Such automatic API specification generation saves time and resources because relevant personnel (such as developers and/or server administrators), who would otherwise spend time documenting existing, and often times, voluminous APIs, can dedicate that time to work on tasks that further enhance the functionality of the system, e.g., by providing additional services to the server. Moreover, automatic generation of an API specification enhances user experience by allowing applications interacting with the server to have access to the complete set of services provided by the server. When an API specification does not document all the services provided by a server, a user without knowledge of the APIs may not know that it has access to certain services that can be used to perform the users' tasks. The innovations described in this specification automatically generate API specifications that can document all the services provided by the server. As a result, applications interacting with the server may have access, using the API specification, to the complete set of services provided the server, which in turn allows users of those applications to select services appropriate for the users' tasks. Relatedly, the innovations described in this specification automatically generate API specifications based on an analysis of the API traffic, regardless of the programming languages in which the underlying APIs are written.

The innovations described in this specification enable automatic updates of API specifications based on present API traffic. Because this specification describes techniques for generating API specifications based on API traffic analysis, these techniques also enable changes to the API specifications based on changes in the API traffic. The changes in the API traffic are analyzed using the same techniques described in this specification and instead of creating a new API specification, these API traffic changes are used to update and/or modify an already-created API specification.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
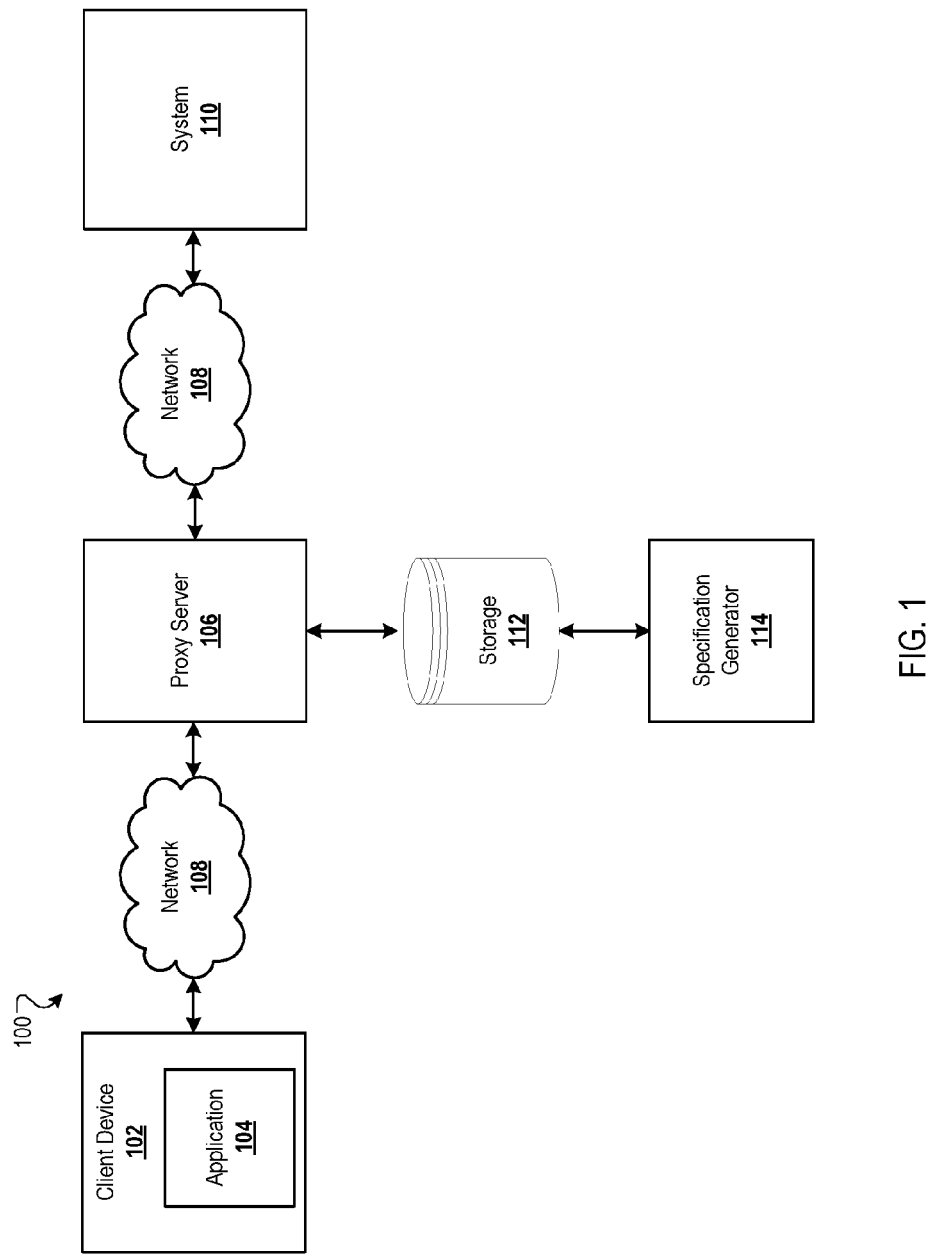
FIG. 1 is a block diagram of an example system that receives and responds to API requests.

This disclosure relates to systems and methods that facilitate automatic generation of Application Programming Interface (API) specification from API traffic between applications and backend systems. As described in more detail below, an API specification generator (also referred to in this specification as specification generator) creates API specifications by analyzing API traffic (e.g., real-time API traffic or API traffic that may be stored in logs), which includes a set of API requests and response to those API requests. Using the set of API requests and responses, the API specification generator identifies attributes (e.g., resource paths, query parameters, variables, response status codes, and response schemas), and uses these attributes to generate an API specification.

The API specification generator identifies variables of the API specification by analyzing resource paths (e.g., a URI or URL path, or any other data structure by which an API request may be expressed) of API requests using a tree data structure. The API specification generator first builds the tree data structure using resource items in the resource paths. Resource items refer to any information that can be named as a resource, such as, but not limited to, a document or image, a temporal service (e.g. "today's weather in New Orleans"), a collection of other resources, and a non-virtual object (e.g., a person). Resource items are separate from each other in resource paths using a delimiter such as a forward slash ("/").

The API specification generator represents the resource items in the resource paths as nodes of the tree data structure. For example, for two resource paths—cars/ford and cars/Toyota—the API specification generator uses "/" as a delimiter to identify Cars, Ford, and Toyota as resource items within the resource paths. The API specification generator uses the resource items and the structure of each resource path to generate the nodes for the tree data structure. In the above example, Cars is the first resource item and is common to both resource paths and thus, the API specification generators represents Cars as the root node of the tree. The resource items, Ford and Toyota, follow Cars in their respective resources paths, and thus, the API specification generator represents these resource items as child nodes of the Cars root node.

The API specification generator uses the generated tree data structure to identify variables. For example, beginning with the root node of the tree data structure, the API specification generator searches for nodes that have a threshold number of child nodes, in which case, the child nodes are determined to represent a variable. In the above example, if the threshold number of child nodes is two, then the two child nodes (Ford and Toyota) satisfy this threshold number of child nodes and thus, the API specification determines that these child nodes represent a single variable (e.g., car models).

In some implementations, the API specification generator identifies query parameters of the API specification by analyzing the resource paths of the API requests. Query parameters are parameters that tailor and filter the response received for an API request. As illustrative examples, query parameters may specify the size of an array for the response or may specify that a list of items received in response to a request should be sorted in ascending order. The API specification generator first identifies the query parameter portion of the resource path. The query parameter portion of the resource path follows the path suffix of the resource path and begins with a first specified delimiter, which is typically a question mark (?). The API specification generator searches for a second specified delimiter (such as, for example, an "&" sign) to identify strings within the query parameter portion that each correspond to a separate query parameter. For each identified string within the query parameter portion, the API specification generator searches for a third specified delimiter (such as, for example, an "=" sign) to identify values appearing before the third specified delimiter as the query parameter and the values appearing after the third specified delimiter as the parameter value.

The API specification generator also identifies other attributes from the set of API requests and responses to those requests. For example, the API specification generator determines the operation type of each of the API requests by searching the API request for one of the known operation types (e.g., get, put, post, delete, etc.). As another example, the API specification generator may identify the response status code and the corresponding response schema from the responses to the prior API requests.

The API specification generator uses the attributes identified from the set of API requests and responses to those requests to generate the API specification. In some implementations, the API specification generator may only use attributes identified from valid API requests. For example, the API specification generator may disregard all API requests and corresponding responses, for which the response status code indicates that the API request is invalid (e.g., all response status codes other than codes in the form 2xx may be considered as invalid requests).

These features and additional features are described in more detail below with reference to FIGS. 1-3.

FIG. 1 is a diagram of an example system 100 that receives and responds to API requests. System 100 includes client device 102, network 108, proxy server 106, storage 112, backend system 110, and specification generator 114.

Network 108, such as a local area network (LAN), a wide area network (WAN), the Internet, or a combination thereof. Network 108 connects client device 102 and proxy server 106. Network 108 also connects proxy server 106 and back-end system 110. The example environment 100 may include many different client devices 102, proxy servers 106, and back-end systems 110.

Client device 102 is an electronic device that is capable of requesting and receiving content and resources over network 108. Example client devices 102 include personal computers, mobile communication devices, digital assistant devices, and other devices that can send and receive data over the network 108. A client device 102 typically includes a user application, e.g., application 104 that may execute in a web browser, to facilitate the sending and receiving of data over the network 108. Moreover, native applications executed by the client device 102 can also facilitate sending and receiving of content over the network 108.

Application 104 executes on client device 102. In various embodiments, an application executing at a client device, such as application 104, may be referred to as a "client." Application 104 can generate an API request to access a service provided by backend system 110, or to retrieve data from or store data in the backend system 110. For example, application 104 can generate the API request based on a user's interaction (e.g., selection(s), inputs(s)) with the application 104, or in response to an event generated by a process for a service. The application 104 causes the client device 102 to send an API request over network 108 to proxy server 106.

Proxy server 106 is an intermediary node that acts as an API proxy between application 104 and back-end system 110. Proxy server 106 may be an API management server that receives API requests from applications, such as application 104, over network 108, and forwards the API requests to one or more backend systems, such as backend system 110, over network 108. Proxy server 106 exposes a set of services provided by backend system 110 to application 104. An example of a service that is provided by backend system 110 is retrieving data from the backend system 110 in response to a particular request initiated by application 104. In some implementations, proxy server 106 is configured to provide authentication for a user using application 104 on behalf of backend system 110. Proxy server 106 serves as a front end for the backend system 110. Proxy server 108 receives incoming API requests and processes them before sending these requests to the backend system 110 for further processing.

Although proxy server 106 of FIG. 1 is implemented as an intermediary node or server that is separate from application 104 and backend system 110, proxy server 106 need not be separate from the backend system 110. In some implementations, the functions performed by proxy server 106 can be implemented by an agent running on backend system 110, in which case, requests and responses are exchanged directly between application 104 and system 110 through the agent running on the backend system 110. In other implementations, proxy server 106 can be implemented by a separate server that receives copies of requests and responses that are exchanged directly between application 104 and system 110.

Upon receiving an API request from application 104, proxy server 106 processes the API request and may convert the request into a format that will be understood by the backend system, before sending the request to the backend system 110. Moreover, proxy server 106 may also analyze whether the API request is valid. For example, if the API request seeks access to a resource of the backend system 110 that is not available publicly or that may not be provided by the backend system 110, proxy server 106 may not process the API request and instead send a message to the application 104 stating that the API request was denied.

Upon receiving the processed API request from proxy server 106, backend system 110 processes this request and sends responses to the processed API requests to proxy server 106, over network 108. Backend system 110 may include one or more servers that provides services and resources that may be accessed by applications, such as application 104.

Upon receiving a response from the backend system 110, proxy server 106 sends these responses to application 104 over network 106. The response to the API request may be a result to a requested operation, such as data that application 104 requested. The response to the API request may also include a status code that indicates whether the API request is valid, which may be based on, for example, whether the request was well-formed. In some implementations, before forwarding a response to the application 104, proxy server 106 may convert a received response to an API request into a format that will be understood by application 104.

Proxy server 106 also stores all the API requests that it receives from client devices 102 and all responses to API requests that it receives from backend system 110, in a storage device 112. Storage device 112 can include one or more databases (or other appropriate data storage structures) stored in one or more non-transitory data storage media (e.g., hard drive(s), flash memory, etc.).

Specification generator 114 generates an API specification based on the API requests and the response to those requests that are stored in the storage device 112, as further described with reference to FIG. 2. Alternatively, specification generator may generate an API specification in real-time, i.e., based on API requests and responses to the API requests received by the proxy server 104 in real-time. In such implementations, specification generator 114 may be an agent running at proxy server 106 that accesses the API requests before proxy server 106 sends these requests to the backend system 110 and responses to the API requests before proxy server 106 sends them to an application 104.

The API specification generated by specification generator 114 may include a description of an API, including one or more operations (which may be referred to as HTTP verbs), resource paths, one or more resource items, query parameters, response codes, and response schemas. The API specification can be described using an API language/format, such as, for example, Web Application Description Language (WADL), Web Services Description Language (WSDL), or Swagger 2.0.

Using the API specification generated by specification generator 114, proxy server 106 can determine whether subsequent API requests received by the proxy server 106 conform to the API specification. This may be useful in assessing whether the API requests are malicious. For example, API requests providing repeated incorrect authentication credentials may not conform with the authentication details specified in the API specification (if the specification generator has proper authorization to store such authentication information) and thus, could be flagged by proxy server 106 as malicious requests.

Proxy server 106 may determine that an API request does not conform to the API specification by comparing one or more attributes of the API request with the attributes of the API specification. For example, proxy server 106 may compare authentication credentials in the API request with the authentication credentials maintained in the API specification. If a match of the authentication credentials is found in the API specification, proxy server 106 may determine that the API request is a conforming request. If a match of the authentication credentials is not found in the API specification, proxy server 106 may determine that the API request is a non-conforming request. Proxy server 106 may continue processing requests that it has determined to be conforming requests, while denying service to those requests that the proxy server 106 has determined to be a non-conforming request.

Figure 2:
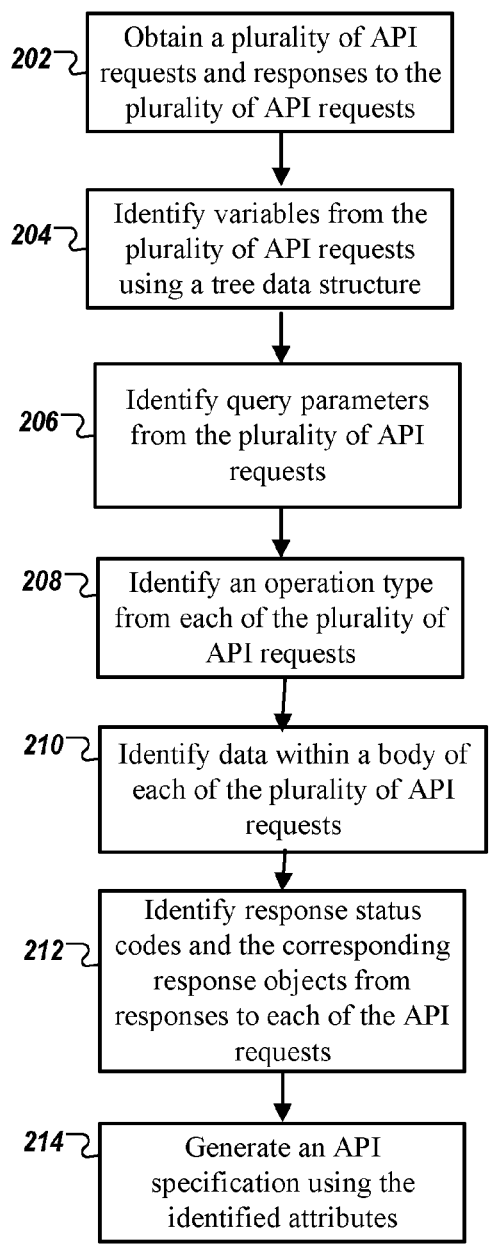
FIG. 2 is a flow diagram of an example process for generating an API specification from a plurality of API requests and responses to those requests.
Figure 3:
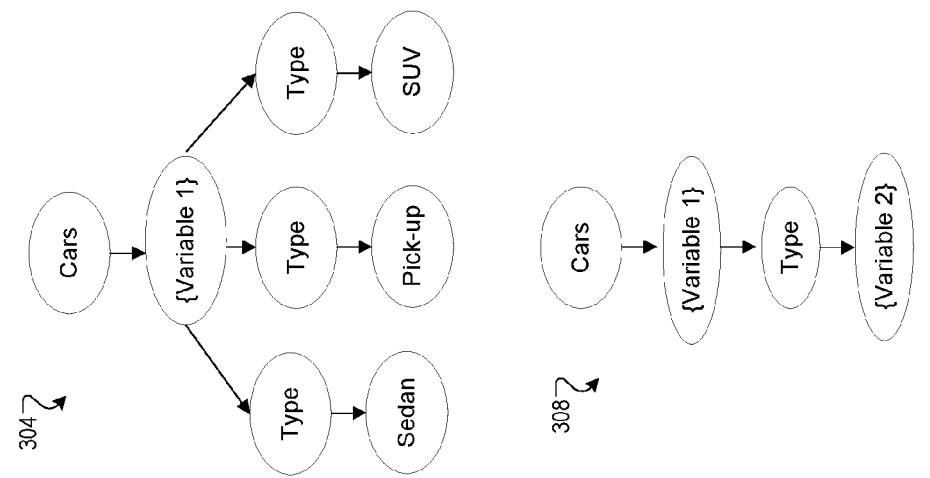
FIG. 3 depicts tree data structures that are used to identify variables of an API specification.
Figure 3:
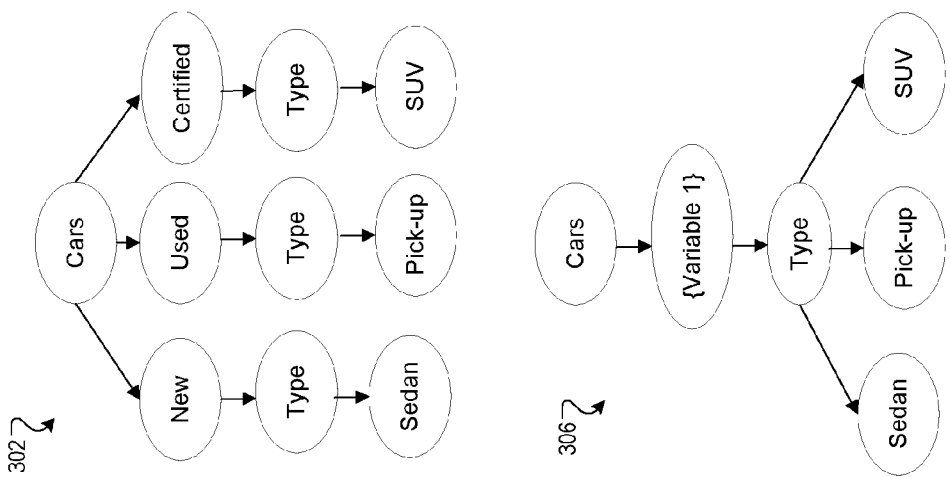

FIG. 2 is a flow chart of an example process 200 for generating an API specification from a plurality of API requests and responses to those requests. Operations of process 200 are described below as being performed by the components of the system 100. Operations of the process 200 are described below for illustration purposes only. Operations of the process 200 can be performed by any appropriate device or system, e.g., any appropriate data processing apparatus. Operations of the process 200 can also be implemented as instructions stored on a non-transitory computer readable medium. Execution of the instructions cause one or more data processing apparatus to perform operations of the process 200.

Specification generator 114 obtains a plurality of API requests and responses to the plurality of API requests (at 202). Specification generator 114 may access the data storage device 112 to obtain API requests and responses to these requests that may be stored there as traffic logs by proxy server 106 (as described above with reference to FIG. 1). Optionally (and as described above with reference to FIG. 1), specification generator 114 may have an agent running at the proxy server 106 that obtains the API requests and responses to API requests as they are received in real-time by proxy server 106.

Specification generator 114 identifies one or more attributes from the plurality of API requests and responses to those requests. An API request comprises a set of attributes that uniquely identifies either a request or a response to the request. For example, an API request may include attributes such as an operation type (also referred to as an HTTP verb), a resource path pattern, and query parameters. The response to an API request may include attributes, including but not limited to, the response status code and the associated response objects that are responsive to the request specified in the API request. The identification of the one or more attributes is achieved by steps 204-212 below.

Specification generator 114 identifies variables of the API specification from the plurality of API requests using a tree data structure (at 204). For example, the API specification generator identifies variables by analyzing resource paths of the API requests using a tree data structure. The specification generator builds a tree data structure using resource items in resource paths of the plurality of API requests. The API specification generator identifies resource items by searching for portions of the resource path that are generally separated by a particular delimiter, such as, for example, a forward slash ("/").

Specification generator 114 represents the identified resource items as nodes of the tree data structure. For example, for two resource paths—<cars/ford> and <cars/Toyota>—the API specification generator identifies Cars, Ford, and Toyota as resource items. The API specification generator uses the identified resource items and the structure of each resource path to generate the appropriate nodes of the tree data structure. In the above example, Cars is the first resource item, which is common to both resource paths, and thus, specification generator 114 represents Cars as the root node of the tree. The resource items, Ford and Toyota, follow Cars in their respective resources paths, and thus, the API specification generator represents these resource items as child nodes descending from the Cars root node.

The specification generator 114 uses the generated tree data structure to identify variables. The API specification generator identifies child nodes that directly descend from the root node. The specification generator 114 determines whether the child nodes satisfy (e.g., meet or exceed) a threshold number of nodes, in which case, specification generator 114 determines that the child nodes represent a variable. In the above example, if the threshold number of child nodes is two, then the two child nodes (Ford and Toyota) satisfy this threshold number of child nodes and thus, specification generator 114 determines that these child nodes represent a single variable (e.g., car models). On the other hand, if the number of identified child nodes does not satisfy the threshold, specification generator 114 determines that the child nodes do not a represent a variable.

Although the above example describes a simple tree with one root node and two child nodes directly descending from the root node, depending on the resource paths for the plurality of API requests, the tree data structure can be more complex. For example, the tree data structure can include several additional nodes, such as, for example, one or more child nodes that directly descend from one or more other child nodes (which in turn may directly or indirectly depend from the root node). An example of such a complex tree data structure is tree 302 as shown FIG. 3, which depicts how tree data structures may be modified to identify variables of an API specification.

Specification generator 114 can use complex trees, such as tree 302, to identify additional variables beyond the first level of child nodes that directly descend from the root node (as described in the preceding paragraphs). Beginning with the root node, for a given node of the tree data structure, specification generator 114 identifies child nodes that directly descend from the given node. Using tree 302 (FIG. 3) as an example, specification generator 114 identifies three child nodes (New, Used, Certified) that directly descend from the root node (Cars). Because specification generator 114 determines these child nodes are different (e.g., the text of these nodes is different), specification generator 114 next determines whether these child nodes satisfy a threshold number of child nodes (which in this example is two). Because the number of these child nodes (three) exceeds the threshold number of child nodes (two), specification generator 114 determines that these child nodes represent a single variable.

Upon identifying a single variable node, specification generator 114 modifies the tree data structure in two ways: (1) by collapsing the child nodes of tree 302 that represent a single variable into a single variable node, and (2) by making child nodes directly descending from each child node that is collapsed into a single variable node, to directly descend from the single variable node. For example, with reference to tree 302 in FIG. 3, specification generator 114 replaces the three child nodes (New, Used, Certified) in tree 302 with a variable node "{Variable 1}." As illustrated, curly brackets may be used around the text of the variable node to represent this node as a variable node. The curly brackets differentiate the variable node from other non-variable nodes of the tree. An administrator of the specification generator 114 may re-label "Variable 1" based to a more user-friendly label such as "Condition." The specification generator 114 may also generate a label based on an analysis of the content (e.g., text, images, videos) on each underlying page corresponding to the three child nodes to determine an appropriate label for the variable node. Specification generator 114 further modifies tree 302 to make each of the child nodes (labeled "Type") now directly descend from the {Variable 1} variable node. The modified tree is shown as tree 304 in FIG. 3 (which may either be a separate tree from tree 302, or the same tree as 302 with fewer nodes).

Specification generator 114 processes the next node after the root node, which in the case of tree 304 is the {Variable 1} variable node. Because specification generator 114 determines the child nodes (Type, Type, Type) directly descending from the {Condition} node are all identical (e.g., by comparing the text of each node to determine if the text matches), specification generator 114 determines that this is a common node (i.e., a node that is the same in each path, and thus is represented by invariable data). Accordingly, specification generator modifies tree 304 by collapsing these identical child nodes into a single node (labeled "Type") directly descending from the {Variable 1} variable node. The modified tree is shown as tree 306 (which may either be a separate tree from tree 304, or the same tree as 304 with fewer nodes).

Specification generator 114 processes the next node after the {Variable 1} variable node, which in the case of tree 306 is the Type node. Specification generator 114 identifies three child nodes (Sedan, Pick-up, SUV) that directly descend from the Type node. Because these child nodes are different (e.g., the text of these nodes is different), specification generator 114 next determines whether these child nodes satisfy a threshold number of child nodes (which in this example is 2). Because the number of these child nodes (three) exceeds the threshold number of child nodes (two), specification generator 114 determines that these child nodes represent a single variable. Specification generator 114 thus modifies tree 306 by collapsing the child nodes (Sedan, Pick-up, SUV) into a single variable node (which in this case is a {Variable 2} variable node. Because no child nodes directly descend from child nodes (Sedan, Pick-up, SUV) that were collapsed into the {Type} variable node, the processing of the specification generator 114 ends. The modified tree is shown as tree 308 (which may either be a separate tree from tree 306, or the same tree as 306 with fewer nodes).

Specification generator 114 identifies as variables, each node of the tree, as finally modified, that has been collapsed into a variable node. For example, specification generator 114 may identify variable nodes by analyzing each node of the finally modified tree (e.g., tree 308) to identify nodes where the text of the node begins and ends with curly brackets. Each node identified in this manner is a variable node. With reference to tree 308, {Condition} and {Type} are variable nodes because these are the only nodes of the tree whose text is within curly brackets.

Specification generator 114 identifies query parameters from the plurality of API requests (at 206). Specification generator 114 first identifies a query parameter portion of the resource path. The query parameter portion of the resource path generally begins with a first specified delimiter, which is typically a question mark (?). Specification generator 114 uses this first specified delimiter to identify the query parameter portion of the resource path. For example, for a resource path <cars/ford?color=red&seat=leather>, specification generator 114 identifies "color=red&seat=leather" as the query parameter portion because it follows the question mark delimeter in the resource path.

Specification generator 114 searches for a second specified delimiter (such as, for example, an "&" sign) within the query parameter portion to identify strings that each correspond to a particular query parameter. In the above example, the "&" delimiter is used to identify two strings within the query parameter portion: "color=red" and "seat=leather." For each identified string within the query parameter portion, specification generator 114 searches for a third specified delimiter (such as, for example, an "=" sign) to identify values appearing before the third specified delimiter as the query parameter and the values appearing after the third specified delimiter as the parameter value. In the above example, specification generator 114 identifies color and seat as query parameters, and red and leather as the respective values of these query parameters.

Specification generator 114 identifies an operation type from each of the plurality of API requests (at 208). Each API request includes an operation type that specifies the type of operation to be performed. Examples of operation types include, but are not limited to, (1) "get( )" which is an operation to retrieve data; (2) "post( )" which is an operation to request the backend system to accept data, and (3) "delete( )" which is an operation to request the backend system to delete data. In some implementations, the specification generator 114 identifies the operation type by searching the portion of the API request that includes the operation type (e.g., the "Type" field of the API request) and looking for a match of this operation type in a list of known operation types maintained by specification generator 114.

Specification generator 114 identifies data within a body of each of the plurality of API requests (at 210). In some implementations, the specification generator 114 can identify and parse the data included in a post( ) operation. The data included in the post( ) operation is generally sent for storage or submission to a backend system 110. The specification generator 114 may identify the body by searching for "Request body" tag (or other appropriate tag used in the system). The specification generator 114 then identifies all the data fields included within the Request Body (or other appropriate tag used in the system).

Specification generator 114 identifies response status codes and the corresponding response schema from responses to each of the API requests (at 212). Responses to an API request that are received from the backend system 110 may include a response code. The response code may be a hypertext transfer protocol (HTTP) status code that indicates whether the API request is valid (e.g., a status code that comprises a 2xx value), invalid (e.g., a status code that comprises either a 4xx or 5xx value), or is associated with a redirection (e.g., a status code that comprises a 3xx value). In some implementations, specification generator 114 extracts the code corresponding to the "response code" field in the response to the API request and identifies this code as the response code. The response to the API request may also include the response schema (which may specify response object/s) associated with the response code. In some implementations, specification generator 114 extracts data corresponding to the "schema" field in the response to the API request and identifies this data as the response schema.

The specification generator 114 generates an API specification using the identified variables, query parameters, operation types, response status codes, and the associated response schema (at 214). Specification generator may use this identified information to generate an API specification using an API language/format, such as, for example, Web Application Description Language (WADL), Web Services Description Language (WSDL), or Swagger 2.0. In some implementations, the specification generator 114 generates the API specification using the identified information only for valid requests, i.e., API requests for which the response code indicated that the web request is valid (e.g., a status code that comprises a 2xx value).

The API specification generated by the specification generator 114 allows for discovery of the services provided by the backend system 110 and provide details about how to instantiate these services. Moreover, using the API specification generated by specification generator 114, proxy server 106 can determine whether subsequent API requests received by the proxy server 106 conform to the API specification. This may be useful in assessing whether the API requests are malicious. For example, API requests providing repeated incorrect authentication credentials may not conform with the authentication details specified in the API specification (if the specification generator has proper authorization to store such authentication information) and thus, could be flagged by proxy server 106 as malicious requests.

After the specification generator 114 has generated an API specification, it can routinely update or modify the API specification based on more recent API traffic. The API specification may be updated and/or modified in the same manner as described above with reference to FIGS. 2 and 3.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method for generation of an application program interface (API) specification, comprising:
   receiving API traffic communicated between one or more client devices and at least one backend system;
   analyzing the API traffic to identify one or more attributes associated with the API traffic, the one or more attributes comprising attributes associated with API requests and API responses corresponding to the API traffic that are determined to be valid; and
   generating the API specification based on the one or more attributes identified as associated with one or more valid API requests.

2. The method of claim 1, comprising updating the API specification based on a change associated with the API traffic.

3. The method of claim 1, wherein the one or more attributes comprise one or more of a resource path, a query parameter, or a response status code.

4. The method of claim 1, wherein the API traffic comprises API requests and responses to the API requests.

5. The method of claim 4, wherein analyzing comprises analyzing the API requests and responses to the API requests.

6. The method of claim 4, comprising determining whether a subsequent API request complies with the API specification generated.

7. The method of claim 6, wherein determining comprises comparing an attribute of the subsequent API request to the one or more attributes identified.

8. The method of claim 1, wherein the API specification generated includes one or more of an API description, one or more operations, resources paths, one or more resource items, query parameters or response codes.

9. A system for generating an application program interface (API) specification, comprising:
   one or more memories storing program instructions; and
   one or more processing devices coupled to the one or more memories, the program instructions causing the one or more processing devices to:
   receive API traffic communicated between one or more client devices and at least one backend system;
   analyze the API traffic to identify one or more attributes associated with the API traffic, the one or more attributes comprising attributes associated with API requests and API responses corresponding to the API traffic that are determined to be valid; and
   generate the API specification based on the one or more attributes identified as associated with one or more valid API requests.

10. The system of claim 9, comprising the program instructions causing the one or more processing devices to update the API specification based on a change associated with the API traffic.

11. The system of claim 9, wherein the one or more attributes comprise one or more of a resource path, a query parameter, or a response status code.

12. The system of claim 9, wherein the API traffic comprises API requests and responses to the API requests.

13. The system of claim 12, comprising the program instructions causing the one or more processing devices to analyze the API requests and responses to the API requests.

14. The system of claim 12, comprising the program instructions causing the one or more processing devices to determine whether a subsequent API request complies with the API specification generated.

15. The system of claim 14, wherein comprising the program instructions causing the one or more processing devices to determine by comparing an attribute of the subsequent API request to the one or more attributes identified.

16. The system of claim 9, wherein the API specification generated includes one or more of an API description, one or more operations, resources paths, one or more resource items, query parameters or response codes.

17. The method of claim 1, wherein the API specification allows for discovery of one or more services provided by the at least one backend system and instructions on how to instantiate the one or more services.

18. The system of claim 9, wherein the API specification allows for discovery of one or more services provided by the at least one backend system and instructions on how to instantiate the one or more services.

* * * * *